(12) United States Patent
Zhao et al.

(10) Patent No.: US 12,365,819 B2
(45) Date of Patent: Jul. 22, 2025

(54) PRIMER COMPOSITION FOR ADHESIVE BONDING AND METHOD OF USING THE SAME

(71) Applicant: Cytec Industries Inc., Princeton, NJ (US)

(72) Inventors: Yiqiang Zhao, Newark, DE (US); Dalip Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 282 days.

(21) Appl. No.: 17/772,436

(22) PCT Filed: Oct. 30, 2020

(86) PCT No.: PCT/US2020/058177
§ 371 (c)(1),
(2) Date: Apr. 27, 2022

(87) PCT Pub. No.: WO2021/087238
PCT Pub. Date: May 6, 2021

(65) Prior Publication Data
US 2023/0313001 A1    Oct. 5, 2023

Related U.S. Application Data

(60) Provisional application No. 62/929,536, filed on Nov. 1, 2019.

(51) Int. Cl.
*B29C 65/00* (2006.01)
*C08G 59/50* (2006.01)
(Continued)

(52) U.S. Cl.
CPC ............ *C09J 163/00* (2013.01); *C08G 59/50* (2013.01); *C09J 5/02* (2013.01); *C09J 7/50* (2018.01);
(Continued)

(58) Field of Classification Search
CPC ..... B29C 65/483; B29C 65/485; C09J 163/00
See application file for complete search history.

(56) References Cited

U.S. PATENT DOCUMENTS

| 5,686,509 A | 11/1997 | Tadashi | |
|---|---|---|---|
| 2008/0254229 A1* | 10/2008 | Lake | B05D 3/068 427/508 |

(Continued)

FOREIGN PATENT DOCUMENTS

| JP | 2015003982 A | 1/2015 |
|---|---|---|
| WO | 2017166188 A1 | 10/2017 |
| WO | 2019135857 A1 | 7/2019 |

OTHER PUBLICATIONS

Kim, D.S., et al., "Effects of Particle size and Rubber Content on Fracture Toughness in Rubber-Modified Epoxies", Polymer Engineering and Science, Mar. 1996, vol. 36, No. 6, pp. 755-768.

(Continued)

*Primary Examiner* — Philip C Tucker
*Assistant Examiner* — Nickolas R Harm
(74) *Attorney, Agent, or Firm* — Thi Dang

(57) ABSTRACT

Disclosed herein is a solvent-based bonding primer composition containing one or more organic solvents, one or more epoxy resins, one or more curing agents, a silane compound, and a low amount of core-shell rubber particles in nanometer size, submicron or micron size. Also disclosed is a method of applying the solvent-based bonding primer composition onto a metallic surface of a first substrate prior to bonding the metallic surface to a second substrate via a curable adhesive.

7 Claims, 2 Drawing Sheets

Formulation 1 primer

(51) Int. Cl.
   *C09J 5/02*    (2006.01)
   *C09J 7/50*    (2018.01)
   *C09J 163/00*  (2006.01)
   *B29C 65/48*   (2006.01)

(52) U.S. Cl.
   CPC .......... *B29C 65/483* (2013.01); *B29C 65/485* (2013.01); *C09J 2400/163* (2013.01); *C09J 2400/166* (2013.01); *C09J 2463/003* (2013.01)

(56) References Cited

U.S. PATENT DOCUMENTS

| | | |
|---|---|---|
| 2010/0247922 A1 | 9/2010 | Kohli |
| 2011/0244245 A1 | 10/2011 | Elgimiabi |
| 2012/0095133 A1 | 4/2012 | Vyakaranam et al. |
| 2013/0225726 A1 | 8/2013 | Takita et al. |
| 2016/0376435 A1* | 12/2016 | Hagenbucher ......... C08G 59/22 |
| | | 427/508 |
| 2019/0382634 A1 | 12/2019 | Elgimiabi |
| 2021/0102061 A1* | 4/2021 | Chen .................. C08G 59/4021 |
| 2022/0127466 A1* | 4/2022 | Brown-Tseng ......... C23C 22/83 |

OTHER PUBLICATIONS

Lin, K-F, et al., "Core-Shell Particles Designed for Toughening the Epoxy Resins. II. Core-Shell-Particle-Toughened Epoxyresins", Journal of Applied Polymer Science, vol. 70, No. 12, Dec. 19, 1998, pp. 2313-2322.

Dynamic mechanical properties and fracture surface morphologies of core-shell rubber (CSR) toughened epoxy at liquid nitrogen(LN2) temperatures, J. Wang et al.

* cited by examiner

Formulation 1 primer

Formulation 2 primer with CSR

Formulation 1 primer

Formulation 2 primer with CSR

Formulation 1 primer

Formulation 2 primer with CSR

PRIMER COMPOSITION FOR ADHESIVE BONDING AND METHOD OF USING THE SAME

CROSS-REFERENCE TO RELATED APPLICATIONS

The instant application is a U.S. national phase entry under 35 U.S.C. § 371 of International Application No. PCT/US2020/058177 filed on Oct. 30, 2020, which claims the benefit of prior U.S. Provisional Application No. 62/929,536 filed on Nov. 1, 2019, the content of each of these prior filed applications is incorporated herein by reference in its entirety.

In the manufacture of composite structures, particularly in the aerospace and automotive industries, it is conventional to bond a fabricated metallic structure to metallic or composite adherends utilizing structural adhesives or to laminate one or more prepreg plies of resin impregnated fibrous reinforcement to the fabricated metallic structure. Bonding typically requires curing the structural adhesives after the structures are joined. In general, to ensure the greatest level of adhesive strength, the metal surface(s) are scrupulously cleaned of dirt, soil, grease, and metal oxidation products immediately prior to bonding. Unfortunately, this procedure cannot be generally used most times as the cleaning and bonding operations are often separated by long periods of inactive time. During such periods, the metal surface may become hydrolyzed, lessening the adhesive strength of the bond. A solution to overcome this difficulty is to apply a primer on the cleaned metal surface(s) prior to adhesive bonding. Such primer is often referred to as a bonding primer.

In the fabrication of aerospace structures requiring bonding a metal structure to another surface, the challenge has been to provide a primer on the metal surface that can maintain an overall balanced bonding performance meeting both bonding strength and long term corrosion protection requirements. When a primer layer is applied by spraying using a spray nozzle onto the surface of a large metal section, for example, an aluminum alloy section of an aircraft having dimensions (width and/or length) of greater 1.5 m, on the production floor, the targeted thickness for the primer layer is typically 0.2 mil (or 5.1 µm). Due to the limited surface area that can be covered by a single spray nozzle at one time and the variation in distance between the spray nozzle and the metal surface, it has been found that the thickness of the primer layer is not uniform across the large surface area being sprayed. Very often, there are portions or sections of the primer layer that have a thickness as thin as 0.1 mil (2.5 µm) or as thick as 0.3 mil (7.6 µm) or above. It is well known to those skilled in the bonding technology that bonding primers show unique thickness sensitivity in terms of bonding strength, particularly peel strength. It has been found that most bonding primer products currently on the market tend to show significant peel strength drop when the primer thickness exceeds about 0.25 mil (6.4 µm). Particularly, peel strength at low temperatures such as −67° F. (−55° C.) drops even more significantly for primer layer having a thickness of greater than 0.25 mil (6.4 µm). Peel strength measurement at such low temperatures is typically required for aerospace applications. Hence, it has been a big challenge to produce bonding primers showing thickness tolerance for low-temperature peel test without negatively affecting the overall performance such as lap shear strength and handling properties. The term "thickness tolerance" in the context herein refers to the ability to withstand variation in thickness. In terms of primer formulation chemistry, an improved primer thickness tolerance requires further toughening efficiency in the polymer networks of the cured primer layer. Moreover, any toughening material added to the primer composition to enhance such toughening efficiency should be compatible with or should work synergistically with the primer chemistry without negatively affecting the primer's overall performance. There remains a need for a method for bonding metallic structures using primer formulations that can provide high toughness in terms of peel strength at low temperatures, particularly, below 0° C., e.g., −55° C., and can be applied at a primer thickness of 0.3 mil (7.6 µm) or above.

DETAILED DESCRIPTION

Figure 1:
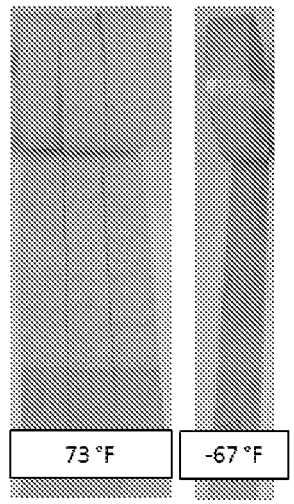
FIGS. 1 and 2 show the failure modes of floating roller peel test done on test coupons using primer films with 0.2 mil thickness.

Disclosed herein is a solvent-based bonding primer composition for applying onto a metallic surface of a first substrate prior to bonding the metallic surface to a second substrate via a curable adhesive.

The bonding primer composition is a solvent-based dispersion having a solid content from 5 wt % to 30 wt % based on the total weight of the composition, where solid content means all components excluding liquid solvent in the primer composition, and containing: one or more epoxy resins, curing agent(s), a silane compound, a low amount of core-shell rubber (CSR), and a mixture of organic solvents. The CSR particles may be in nanometer size (below 100 nm), submicron size (100 nm to 1000 nm) or micron size (1 micron to 100 microns). Preferably, the CSR particles are nano-size particles with particle size at about 100 nm or below. The amount of CSR particles is less than 2 wt % (weight percent) based on the total weight of the composition, preferably, within the range of 0.2 wt % to 0.8 wt %.

According to one embodiment, the solvent-based primer composition is a dispersion containing:
  (i) 5-15 wt % of an epoxy component comprising one or more epoxy resin(s);
  (ii) 10-20 parts of a curative component per 100 parts of epoxy component, the curative component comprising one or more curing agent(s), and optionally, one or more catalyst(s);
  (iii) 0.1 to 2 wt % organosilane;
  (iv) 0.2-0.8 wt % CSR particles; and
  (v) a mixture of two or more organic solvents to provide 5 wt % to 30 wt % solids.

The wt % disclosed above is based on the total weight of the composition.

Optionally, the primer composition contains up to 3 wt % of at least one chromate or non-chromate corrosion inhibitor, and/or up to 0.3 wt % inorganic fillers in particulate form and/or pigment/dyes. The term "up to" means greater than zero (0).

The solvent mixture includes volatile organic solvents such as methyl ether ketone (MEK), diacetone alcohol (DAA), tetrahydrofuran (THF), isopropyl alcohol, acetone, ethylene glycol, xylene, toluene, and ethyl acetate. The solvent in this context does not include water. Water is not added to form the solid content disclosed above. In one embodiment, the solvent mixture includes MEK in combination with at least one solvent selected from: diacetone alcohol (DAA), acetone, isopropyl alcohol, tetrahydrofuran (THF), ethylene glycol, xylene, toluene, and ethyl acetate. In a preferred embodiment, the solvent mixture includes methyl ether ketone (MEK) and diacetone alcohol (DAA). Preferably, the weight ratio of MEK to DAA is from 60:40 to 95:05, preferably, 70:30 to 90:10. In another embodiment, the solvent mixture is composed of MEK, DAA and THF, where the amount of MEK is more than 50 wt % based on the total weight of the mixture.

The solvents are selected so as to produce a homogeneous solution with no separated phases before the addition of any corrosion inhibitor. The CSR particles are dispersed uniformly throughout this homogeneous solution. "Homogeneous solution" means a homogeneous mixture of multiple substances in a single phase, where the solvent or solvent mixture is present in the largest amount. Components (i)-(v) mentioned above form a single phase. The homogeneous solution can remain in this one-phase stability for very long period of time, e.g., greater than 1 year. The solvent-based primer composition has a long shelf life of at least 180 days at room temperature (23° C.-25° C.) and much longer at refrigerated temperature of 4° C.-8° C. or below, wherein the CSR particles do not settle to the bottom of the container or agglomerate. Such CSR particles settlement or agglomeration would adversely affect the primer film quality and bonding performance. It has been found that the homogeneous solution with the uniformly dispersed CSR particles, in absence of corrosion inhibitor particles, can remain in this state at room temperature, undisturbed, for more than 1 year without substantial settlement or agglomeration of the CSR particles.

Generally, the surface treatment for treating a metallic surface prior to adhesive bonding includes:
  applying the solvent-based primer composition disclosed herein onto a metallic surface to form a curable primer film having a continuous surface.

Generally, the primer composition of the present disclosure is incorporated in a bonding method that includes:
  (a) applying the solvent-based primer composition on a metallic surface of a first substrate to form a curable primer film;
  (b) adhesively joining the first substrate with the primer film thereon to a second substrate whereby a curable, polymeric adhesive is positioned between the primer film and the second substrate; and
  (c) curing the primer film and the adhesive to form a bonded structure.

The metallic surface to be treated may be the surface of a metal selected from aluminum and aluminum alloy, steel, titanium and titanium alloy.

For adhesive bonding of a metallic substrate to another substrate (metal or composite substrate), the solvent-based primer composition of the present disclosure may be applied onto a metallic surface by spray nozzle or hand brushing to form a curable primer film. The primer composition may be applied, e.g. by spraying or brushing, to the metallic surface in several coats until a desired film thickness is achieved. Then the primed surface is allowed to dry in air, e.g., for 15 to 40 minutes, before curing and bonding.

The metallic surface is preferably pre-treated prior to applying the primer composition in order to enhance the adhesion of the metallic surface to the subsequently applied primer film. The primer film is cured in an oven at an elevated temperature, e.g. 250° F. to 350° F. (121° C. to 177° C.), for one hour prior to bonding assembly. The primed surface of the metallic substrate is then adhered to the second substrate by providing a curable, polymeric adhesive film between the primed surface and the second substrate. The second substrate may be another metallic substrate (e.g., aluminum or aluminum alloy, steel, titanium or titanium alloy) or a composite substrate composed of reinforcement fibers embedded in or impregnated with a matrix resin. The adhesive may be applied onto a surface of the second substrate, or alternatively, the adhesive may be applied onto the primed surface of the first substrate. The resulting assembly is then subjected to curing at an elevated temperature to cure the adhesive, and consequently, to produce a bonded structure. Curing may be carried out by applying heat and pressure to the assembly. The primer composition is formulated so that it can be compatible with conventional curable, polymeric adhesives (particularly, epoxy-based adhesives) that are curable at temperatures within the range of 250° F. to 350° F. (121° C. to 177° C.).

The term "substrate" as used herein includes layers and structures of any shape and configuration.

The terms "cure" and "curing" as used herein refer to the hardening of a polymer material by cross-linking of polymer chains, brought about by chemical additives, ultraviolet radiation or heat. Materials that are "curable" are those capable of being cured, i.e. becoming harden.

When the second substrate is a composite substrate composed of reinforcement fibers and matrix resin, the matrix resin may be partially or fully cured, or uncured. When the matrix resin is uncured or only partially cured prior to the adhesive joining of the two substrates, full curing of the matrix resin occurs simultaneously with the curing of the adhesive during the bonding stage.

To enhance the adhesion of the metallic surface to the subsequently applied polymeric primer film, the metallic surface may be pre-treated prior to applying the primer compositions thereon. Suitable surface treatments include wet etching, anodization such as phosphoric acid anodization (PAA), and phosphoric acid/sulfuric acid anodization (PSA), and sol-gel processes that are known to those skilled in the art. A more specific example of a suitable surface treatment is ASTM D2651, which includes cleaning with a soap solution, followed by wet etching and then anodizing with an acid solution. The solvent-based primer composition disclosed herein is formulated to be compatible with these various surface treatments.

PAA typically involves using phosphoric acid (e.g. ASTM D3933) to form metal oxide surfaces, and PSA typically involves using phosphoric-sulphuric acid to form metal oxide surfaces. Anodizing produces a porous, rough surface into which the primer composition can penetrate. Adhesion results primarily from mechanical interlocking between the rough surface and the primer film.

Sol-gel process typically involves the growth of metal-oxo polymers through hydrolysis and condensation reactions of an aqueous solution of organo-functional silane and zirconium alkoxide precursors to form inorganic polymer networks on the metal surface. The sol-gel coating can provide good adhesion between the metal surface and the subsequently-applied primer film via covalent chemical bonding.

Epoxy Resins

Suitable epoxy resins include multifunctional epoxy resins having functionality of at least about 1.8, or at least about 2 functionalities. The epoxy resins are optionally chain-extended, solid glycidyl ethers of phenols, such as resorcinol and the bisphenols, e.g., bisphenol A, bisphenol F, Novolac and the like. Also suitable are the solid glycidyl derivatives of aromatic amines and aminophenols, such as N,N,N',N'-tetraglycidyl-4,4'-diaminodiphenylmethane. Moreover, the epoxy resins may have an epoxy equivalent weight (EEW) of about 100-8000.

The epoxy resins may be in solid form, a dispersion or a solution of solid epoxy in solvent or other continuous phase media. The epoxy resin in dispersed phase may be a dispersion of more than one epoxy resin in the form of a mixture of distinct particles, or may consist of only one type of particles containing more than one epoxy resin. Thus, a flexibilizing epoxy such as the higher molecular weight bisphenol A or bisphenol F epoxies may be blended with a high-temperature resistant epoxy such as tetraglycidyl methylene dianiline (TGMDA), then the mixture is dissolved or dispersed into the solvent or other continuous phase media. These same epoxy resins might be advantageously dispersed separately without blending.

A mixture of different epoxy resins may be used. In one embodiment, the mixture of epoxy resins includes novolac epoxy resin and diglycidyl ether of bisphenol A ("DGEBA") resin. Examples include novolac epoxy resins such as EPON SU-8 available from Hexion, and bisphenol A epoxy resins such as D.E.R. 669 and D.E.R. 664 available from Dow Chemical Co. In another embodiment, the resin mixture contains an epoxy resin having a functionality of about 4 or less, and an epoxy resin having a functionality of about 5 or more. The use of higher functionality epoxy resins, i.e., epoxy resins having a functionality of five or more, in minor amounts is suitable, for examples less than 40 wt. % based on the sum of the weights of all epoxy resins in the composition. The use of such higher functionality epoxy resins in such minor amounts has been found to increase the solvent resistance of the cured primer composition without substantially lowering the adhesive properties.

In one embodiment, the primer composition includes a mixture of the following epoxy resins:
1) from 30 to 80 wt. % of an epoxy resin having a functionality of from about 1.8 to about 4 and an epoxy equivalent weight of from about 400 to about 1000;
2) from 5 to 35 wt. % of an epoxy resin having a functionality of from about 1.8 to about 4 and an epoxy equivalent weight of from about 2000 to about 8000; and
3) from 5 to 25 wt. % of an epoxy resin having a functionality of about 5 or more and having an epoxy equivalent weight of from about 100 to about 400, wherein the weight percentages totaling 100% based on total weight of the epoxy mixture.

The total amount of epoxy resin(s) may be about 5 to 15 wt % based on total weight of the primer composition.

Core Shell Rubber Particles

Individual core shell rubber (CSR) particle generally has a core composed of a polymeric material having elastomeric or rubbery properties (i.e., a glass transition temperature less than about 0° C., e.g., less than about −30° C.) surrounded by a shell composed of a non-elastomeric polymeric material (i.e., a thermoplastic or thermoset/crosslinked polymer having a glass transition temperature greater than ambient temperatures, e.g., greater than about 50° C.). For example, the core may be composed of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. The polymer or copolymer used for the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other elastomeric polymers may also be suitably be used for the core, including polybutylacrylate or polysiloxane elastomer (e.g., polydimethylsiloxane, particularly crosslinked polydimethylsiloxane). The particle may be composed of more than two layers (e.g., a central core of one elastomeric material may be surrounded by a second core of a different elastomeric material or the core may be surrounded by two shells of different composition or the particle may have the structure soft core, hard shell, soft shell, hard shell). Either the core or the shell or both the core and the shell may be crosslinked (e.g., ionically or covalently), as described, for example, in U.S. Pat. No. 5,686,509. The shell may be grafted onto the core. The polymer making up the shell may bear one or more different types of functional groups (e.g., epoxy groups, carboxylic acid groups) that are capable of interacting with other components of the primer compositions. The particle may have more than two layers (e.g., a central core of one elastomeric material may be surrounded by a second core of a different elastomeric material or the core may be surrounded by two shells of different composition). The core constitutes from about 50% to about 95% by weight of the particle while the shell constitutes from about 5% to about 50% by weight of the particle.

In preferred embodiments, the CSR particles have a polybutadiene rubber core, styrene-butadiene rubber core, or silicone rubber core and a polyacrylate or butadiene-acrylic copolymer or butadiene-styrene copolymer shell.

It is preferred that the CSR particles are pre-dispersed in a solvent or resin to maintain the original particle size before and after addition into the primer formulation. For example, it can be pre-dispersed in any of the previously mentioned epoxy resins at concentration of 10 wt %-60 wt %. Pre-dispersed CSR particles are commercially available from Kaneka under the trademark Kane Ace™ MX, including, for example, MX 120 (liquid Bisphenol A epoxy with about 25 wt. % CSR), MX 125 (liquid Bisphenol A epoxy with about 25 wt. % CSR), Kane Ace MX-156 (liquid Bisphenol A epoxy with about 25 wt. % CSR), MX 215 (Epoxidized Phenol Novolac with about 25 wt. % CSR), MX-217 (phenol novolac epoxy with about 25 wt. % CSR, MX-135 (liquid Bisphenol F epoxy with about 25 wt. % CSR). Alternatively, CSR in fine powdery form can also be used. The CSR particles may have nanometer size (below 100 nm), submicron size (100 nm to 1000 nm) or micron size (1 micron to 100 microns). In certain embodiments, the CSR particle size is in the range of 10 nm-3000 nm, preferably, 10 nm-500 nm. The particle size measurement can be carried out by Scanning Electron microscopy (SEM) or Scanning Transmission Electron Microscopy (STEM) for sizes less than 1 micron or optical microscopy for submicron and larger particle sizes.

It is desirable that the CSR particles form a highly stable dispersion, i.e., do not agglomerate, in the primer composition for a long period of time, preferably, more than one month, and maintain the original particle size after they are added into the primer composition.

Curing Agents and Catalysts

The solvent-based primer composition contains one or more amine-containing curing agents, preferably, latent amines which are not reactive at room temperature (23° C.-25° C.). Suitable curing agents include aromatic diamines, dicyandiamide (DICY), and hydrazides. Specific examples of aromatic diamines include 2,2-Bis-4-(4-aminophenoxy) phenyl propane (BAPP) (available from BASF), 4, 4'-diamino-diphenylsulfone (4,4'DDS), and 3,3'-diaminodiphenylsulfone (3,3'DDS). Hydrazides include dihydrazides, trihydrazides and tetrahydrazides. The dihydrazides, for instance, are represented by the active group [$H_2NHNC(=O)-R-C(=O)NHNH_2$] wherein R is any polyvalent organic radical, for instance carbodihydrazide ($R=CH_2$). Specific examples include adipic acid dihydrazide (ADH), sebacic acid dihydrazide (SDH), valine dihydrazide (VDH), isophthalic acid dihydrazide (IDH), phthalic dihydrazide, terephthalic dihydrazide and naphthalene dicarboxylic acid dihydrazide. Other hydrazide curing agents include 1,2,3-benzenetricarboxic trihydrazide, trimellitic trihydrazide, trimesic trihydrazide, aromatic monohydrazides, aliphatic monohydrazides, aliphatic monohydrazides, aliphatic dihydrazides, aliphatic trihydrazides, aliphatic tetrahydrazides, aromatic monohydrazides, aromatic dihydrazides, aromatic trihydrazides, aromatic tetrahydrazides and naphthanoic acid hydrazide.

Catalysts or accelerators may be added as an optional component to speed up the curing/crosslinking of the thermoset resins or to enable curing at lower temperatures. Such catalysts/accelerators may be added when a particular curing agent is not sufficiently active at the primer composition's heating temperature to effect cure of the primer composition. For example, where a curing agent is active at 350° F., a catalyst is added to enable curing at around 250° F. The catalyst/accelerators may be in particulate form having a particle size such that essentially 100% of the particles have a mean diameter of less than about 30 μm. Preferred catalysts/accelerators include, but are not limited to: bisureas, and imidazoles. A preferred bisurea is toluene-2, 4-bis (N,N'-dimethyl urea). In some embodiments, a combination of BAPP and bisurea is used.

The curing agent(s), solely or in combination with one or more catalyst(s)/accelerator(s), may be present in amounts from about 2 to 30 parts per 100 parts of the epoxy resin in total (i.e. total amount of epoxy or epoxies).

Silane Compounds

The silane compound in the solvent-based primer composition has silane functional groups that can react or bond to the material to be bonded to a metallic surface. Suitable silane compounds include organosilanes. Organosilanes having hydrolyzable groups are preferred. In certain embodiments, the organosilanes have the following general formula:

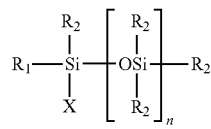

wherein n is greater than or equal to 0; wherein each X is OH, $OCH_3$, and $OCH_2H_5$; wherein $R_1$ is $CH=CH_2$,

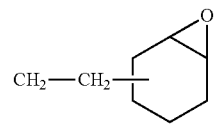

or $CH_2-CH_2-CH_2-Y$, wherein Y is $NH_2$, SH, OH, NCO, $NH-CO-NH_2$, $NH-(CH_2)_3NH_2$, NH-Aryl,

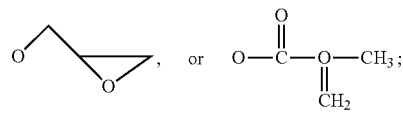

and wherein each $R_2$ is alkyl, alkoxy, aryl, substituted aryl, or $R_1$.

Examples of suitable, commercially available organosilane compounds are those available from Momentive Performance Materials Inc. including, but are not limited to, Silquest™ A-186, a beta-(3,4-epoxycyclo hexyl)ethyltrimethoxy silane; Silquest™ A-187, a gamma-glycidoxypropyl-trimethoxysilane; Silquest™ A-189, a gamma-mercaptopropyltrimethoxysilane; Silquest™ A-1100, a gamma-aminopropyltriethoxysilane; Silquest™ A-1170, a bis-(gamma-trimethoxy-silylpropyl)amine; and Y-9669, a N-phenyl-gamma-aminopropyl-trimethoxysilane. Other suitable commercially available organosilanes include, but are not limited to, DOWSIL™ Z-6040 Silane, a gamma-glycidoxypropyl-trimethoxy silane from the Dow Chemical Company.

Generally, the organosilane is present in the solvent-based primer composition in amounts ranging from about 0.1 to 2 wt % based on the total weight of the composition.

Corrosion Inhibitors

The solvent-based primer composition disclosed herein may include corrosion inhibitors to further improve long-term, anti-corrosion performance.

Chromates or non-chromate corrosion inhibitors may be used in the solvent-based primer composition, however, to comply with environmental, health and safety regulations, non-chromate compounds are preferred. Examples of suitable chromate corrosion inhibitors include strontium chromate, barium chromate, zinc chromate, and calcium chromate. Non-chromate corrosion inhibitors include inorganic compounds containing one or more ions selected from the group consisting of $NaVO_3$, $VO_4$, $V_2O_7$, phosphate, phosphonate, molybdate, cerium, and borate. Examples of inorganic, non-chromate corrosion inhibitors include, but are not limited to, a metavanadate anion, such as sodium metavanadate, a combination of a molybdate and metavanadate, or any combinations of molybdate, metavanadate, phosphate, phosphonate, cerium or borate. Carbon-based materials such as graphene are also suitable. Also suitable are organic corrosion inhibitors, including those that are chemically anchored to the surface of a particle or encapsulated and are releasable in the event of corrosion. Examples of such releasable organic corrosion inhibitors are described in U.S. Patent Application Publication 2010/0247922, published on Sep. 30, 2010. A combination of different corrosion inhibitors may be used.

When added, the total amount of corrosion inhibitor may be up to 3 wt % based on the total weight of the primer composition.

Optional Additives

The solvent-based primer composition may optionally contain conventional dyes, pigments, and inorganic fillers. The total amount of such optional additives is less than 3 wt. %, for example, 0.1 wt. % to 2 wt. %. A benefit of compositions containing dyes or pigments is that the surface coverage can be assessed more easily by visual methods. Inorganic fillers, in particulate form, may also be added in order to control the rheology for application process and stability. Suitable inorganic fillers include fumed silica, clay particles, and the like.

EXAMPLES

The following examples show the performance results obtained using a solvent-based bonding primer formulation with a low amount of CSR particles as compared to other primer formulations which do not contain such CSR particles.

Example 1

Primer Formulations 1 and 2 were prepared according to the formulations disclosed in Table 1.

TABLE 1

| Components | Formulation 1 Amount | Formulation 2 Amount |
|---|---|---|
| Bisphenol A epoxy | 31 gms | 31 gms |
| Epoxy novolac resin | 6.3 gms | |
| Epoxy novolac resin with 25 wt % CSR | | 8 gms |
| Solid Bisphenol A-based epoxy (powder) | 8 gm | 8 gm |
| 2,2-Bis-4-(4-aminophenoxy) phenyl propane (BAPP) | 6 gms | 6 gms |
| Toluene-2,4-bis (N,N'-dimethyl urea) | 1.8 gms | 1.8 gms |
| Plastic Yellow #72 (pigment) | 0.5 gms | 0.5 gms |
| Organosilane (gamma-glycidoxypropyltrimethoxy silane) | 2.4 gms | 2.4 gms |
| Methyl Ether Ketone | 452 gms | 452 gms |
| Diacetone Alcohol | 68 gms | 68 gms |

Each of the primer formulations was sprayed onto a surface treated aluminum alloy sheet using spray gun to form a primer film having 0.2 mil thickness. This priming step was repeated on another aluminum alloy sheet to form a primer film having 0.3 mil thickness. The surface treatment was according to ASTM D 2651, which includes cleaning, FPL etching and PAA anodization. The resulting uncured films were left to dry by air at ambient temperature. Floating Roller Peel test (ASTM D3167) was carried out to determine the bonding performance of the primer films. These tests were done after bonding the primed surface to another aluminum alloy sheet using a curable, epoxy-based adhesive (FM 73M and FM 94M from Cytec Industries Inc.), followed by curing.

Floating roller peel test results for primer Formulation 1 without CSR nanoparticles are reported in Table 2.

TABLE 2

| Test Temp. | FM 73M 0.2 mil | FM 94M 0.2 mil | FM 73M 0.3 mil | FM 94M 0.3 mil |
|---|---|---|---|---|
| 23° C. (73° F.) | 94 | 55 | 91 | 57 |
| −55° C. (−67° F.) | 51 | 37 | 32 | 28 |

Floating roller peel test results for primer Formulation 2 with core-shell rubber nanoparticles at 3.5% loading based on total solids are reported in Table 3.

TABLE 3

| Test Temp. | FM 73M 0.2 mil | FM 94M 0.2 mil | FM 73M 0.3 mil | FM 94M 0.3 mil |
|---|---|---|---|---|
| 23° C. (73° F.) | 97 | 61 | 100 | 61 |
| −55° C. (−67° F.) | 69 | 56 | 69 | 41 |

Figure 2:
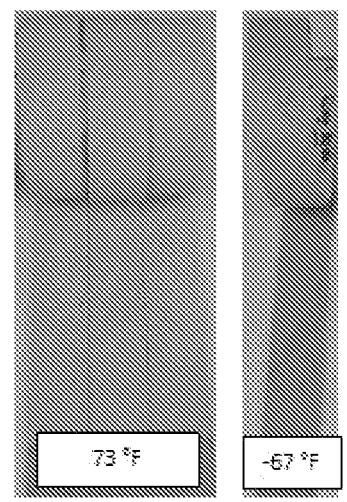

FIGS. 1 and 2 show the failure modes of floating roller peel test coupons using Formulations 1 and 2, respectively, at 0.2 mil primer thickness and FM 73 M adhesive.

Figure 3:
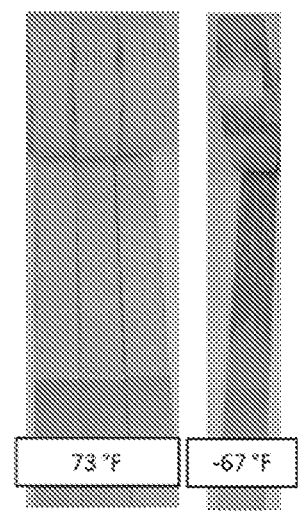
FIGS. 3 and 4 show the failure modes of floating roller peel test done on test coupons using primer films with 0.3 mil primer thickness.
Figure 4:
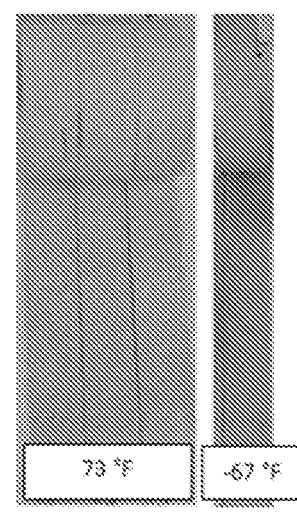

FIGS. 3 and 4 show the failure modes of floating roller peel test coupons using Formulations 1 and 2, respectively, at 0.3 mil primer thickness and FM 73 M adhesive.

Figure 5:
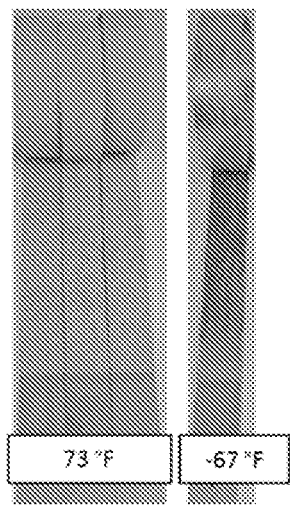
FIGS. 5 and 6 show failure modes of floating roller peel test done on test coupons using primer films with 0.3 mil thickness.
Figure 6:
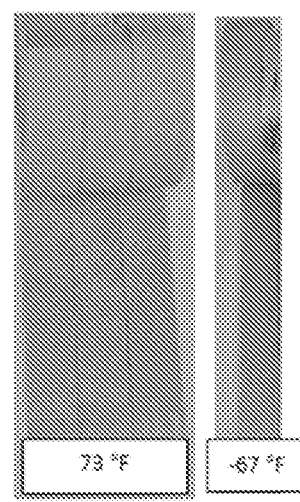

FIGS. 5 and 6 show failure modes of floating roller peel test coupons using Formulations 1 and 2, respectively, at 0.3 mil primer thickness and FM 94 M adhesive.

Formulations 1 and 2 in Table 1 are primer compositions without and with CSR particles, respectively. The peel testing results at 0.2 mil and 0.3 mil thickness based on both formulations and two adhesives (FM 73 and FM 94 bonding adhesives) are compared in Tables 2 and 3, and FIGS. 1-6. The low temperature peel strength at −55° C. (−67° F.) based on Formulation 2 with low loading of CSR particles are substantially higher than that for Formulation 1, particularly for 0.3 mil thickness. The failure modes of tested coupons for Formulation 2 are also much more cohesive than Formulation 1, as shown in FIGS. 2-4. In fact, Formulation 2 shows almost identical strength for both 0.2 mil and 0.3 mil thickness at room temperature and low testing temperatures. These striking results prove the efficacy of utilizing CSR particles for toughness enhancement of primer layer. Moreover, Formulation 2 with low CSR loading shows identical spraying and film forming performance to those of Formulation 1. The 3000-hour corrosion performance for both Formulations 1 and 2 all readily passed the performance requirement.

Example 2

Primer Formulations 3 and 4 were prepared according to the formulations disclosed in Table 4.

TABLE 4

| Components | Formulation 3 Amount | Formulation 4 Amount |
|---|---|---|
| Bisphenol A epoxy | 31 gms | 31 gms |
| Epoxy novolac resin | 6.1 gms | 6.1 gms |
| CSR powder: Paraloid EXL-2691A | 2.0 gms | |
| CSR powder: ZEFIAC F351 | | 2.0 gms |
| Solid Bisphenol A-based epoxy (powder) | 8 gm | 8 gm |
| 2,2-Bis-4-(4-aminophenoxy) phenyl propane (BAPP) | 6 gms | 6 gms |
| Toluene-2,4-bis (N,N'-dimethyl urea) | 1.8 gms | 1.8 gms |
| Plastic Yellow #72 (pigment) | 0.5 gms | 0.5 gms |
| Organosilane (gamma-glycidoxypropyltrimethoxy silane) | 2.4 gms | 2.4 gms |
| Zinc Phosphate | 0.9 gms | 0.9 gms |
| Methyl Ether Ketone | 459 gms | 459 gms |
| Diacetone Alcohol | 69 gms | 69 gms |

Each of the primer formulations was sprayed onto a surface treated aluminum alloy sheet using spray gun to form a primer film having 0.3 mil thickness. Floating roller peel test was carried out as described in Example 1 using FM 94 M adhesive. The results for primer Formulation 3 and 4 using powdery CSR at 0.3 mil thickness are reported in Table 5.

TABLE 5

| Test Temp. | Formulation 3 | Formulation 4 |
|---|---|---|
| Peel at 23° C. (73° F.) | 44 | 47 |
| Peel at −55° C. (−67° F.) | 46 | 43 |
| Film appearance | Very rough, no pass | Smooth, pass |

Formulations 3 and 4 in Table 4 are primer compositions including two powdery CSR products respectively, Paraloid EXL-2691A from DOW or ZEFIAC F351 from AICA KOGYO Co., at same CSR loading ~3.5% based on dry solids. Both formulations are capable of showing very good ambient and low temperature peel strength at 0.3 mil thickness for FM 94 bonding adhesive (in Table 5). However, the cured primer film using Paraloid EXL-2691A is too rough and fails the film appearance requirement. In comparison, ZEFIAC F351 one shows smooth cured film and achieves balanced overall performance. Apparently, Paraloid EXL-2691A shows more aggregation in primer formulation than ZEFIAC F351. These results clearly demonstrate that it is important for powdery CSR particles to be well dispersed in the primer network matrix in order to achieve much improved low temperature peel strength at no cost of other performance.

What is claimed is:

1. A surface treatment for treating a metallic surface prior to adhesive bonding comprising:
   applying a primer composition onto a metallic surface to form a curable primer film having a continuous surface, the primer composition comprising:
   (i) one or more epoxy resins;
   (ii) at least one amine-containing curing agent;
   (iii) a silane compound having at least one hydrolyzable group;
   (iv) core-shell rubber (CSR) particles; and
   (v) a mixture of organic solvents comprising methyl ether ketone (MEK) in combination with at least one solvent selected from: diacetone alcohol (DAA), acetone, isopropyl alcohol, tetrahydrofuran (THF), ethylene glycol, xylene, toluene, and ethyl acetate,
   wherein the primer composition has a solid content of 5%-30%, and the amount of CSR particles is less than 2 wt. % (weight percent) based on the total weight of the composition,
   wherein water is not added to the primer composition, and
   wherein components (i)-(v) in the primer composition form a homogeneous solution.

2. The surface treatment of claim 1, wherein the at least one amine-containing curing agent is selected from: aromatic diamines, dicyandiamide (DICY), and hydrazides.

3. The surface treatment according to claim 1, wherein the mixture of organic solvents consists of methyl ether ketone (MEK) and diacetone alcohol (DAA).

4. The surface treatment according to claim 3, wherein the weight ratio of MEK to DAA is from 60:40 to 95:05.

5. The surface treatment according to claim 1, wherein the CSR particles have particle size in the range of 10 nm-3000 nm.

6. The surface treatment according to claim 1, wherein the primer composition further comprises a corrosion-inhibiting compound.

7. The surface treatment according to claim 1, wherein the metallic surface is subjected to anodization or sol-gel process to form a metal oxide coating prior to applying the primer composition.

* * * * *